United States Patent
Sye (10) Patent No.: US 8,148,650 B2
(45) Date of Patent: Apr. 3, 2012

(54) MAILING MACHINE TRANSPORT SYSTEM WITH INTEGRAL SCALE FOR WEIGHING MAIL PIECES WHERE THE CONTACT FORCE ON THE TAKE AWAY ROLLERS IS REDUCED TO ELIMINATE OSCILLATIONS OF THE WEIGHING PLATFORM

(75) Inventor: Chiping Sye, Stamford, CT (US)

(73) Assignee: Pitney Bowes Inc., Stamford, CT (US)

( * ) Notice: Subject to any disclaimer, the term of this patent is extended or adjusted under 35 U.S.C. 154(b) by 300 days.

(21) Appl. No.: 12/640,478

(22) Filed: Dec. 17, 2009

(65) Prior Publication Data

US 2011/0147095 A1  Jun. 23, 2011

(51) Int. Cl.
G01G 19/40 (2006.01)
G01G 23/06 (2006.01)
G01G 23/12 (2006.01)

(52) U.S. Cl. .............. 177/25.15; 177/145; 177/184; 177/189; 705/407

(58) Field of Classification Search ........... 177/25.15, 177/145, 184–189; 705/407, 414–416
See application file for complete search history.

(56) References Cited

U.S. PATENT DOCUMENTS

| | | | |
|---|---|---|---|
| 4,709,770 A * | 12/1987 | Kohashi et al. ........... 177/50 |
| 4,848,492 A | 7/1989 | Hubbard et al. |
| 5,054,566 A | 10/1991 | Freeman |
| 5,094,306 A | 3/1992 | Cohen et al. |
| 5,109,937 A | 5/1992 | Kipp |
| 5,190,117 A | 3/1993 | Freeman et al. |
| 5,256,835 A | 10/1993 | Rydzak |
| 5,723,825 A | 3/1998 | Dolan et al. |
| 5,726,393 A * | 3/1998 | Lyga ................ 177/25.15 |
| 5,813,327 A | 9/1998 | Freeman et al. |
| 5,856,637 A * | 1/1999 | Vande Berg ............ 177/145 |
| 6,713,689 B2 | 3/2004 | Eaton et al. |
| 6,759,602 B2 | 7/2004 | Miller et al. |
| 6,820,873 B2 | 11/2004 | Kulpa |
| 6,839,697 B2 | 1/2005 | Eaton et al. |
| 6,940,025 B1 * | 9/2005 | Salomon ............. 177/25.15 |
| 7,247,801 B2 | 7/2007 | Salazar et al. |
| 7,750,254 B2 * | 7/2010 | Wall et al. ........... 177/25.15 |
| 2005/0205307 A1 * | 9/2005 | Salomon ............... 177/1 |
| 2011/0036647 A1 * | 2/2011 | Schulzki ............ 177/145 |
| 2011/0290569 A1 * | 12/2011 | Turner ................ 177/1 |

* cited by examiner

Primary Examiner — Randy W Gibson
(74) Attorney, Agent, or Firm — Brian A. Lemm; Charles R. Malandra, Jr.; Steven J. Shapiro (57) ABSTRACT

A transport system that reduces the amount of oscillation of the weighing platform thereby weighing mail pieces faster. A take-away nip of the weighing module is formed by a pivot arm having a roller mounted thereon and a drive roller mounted in the weighing platform. The take-away nip feeds mail pieces from the weighing platform to the subsequent module of the mailing machine. The pivot arm has a biasing mechanism with a force that results in less impact force between the pivot arm roller and drive roller when the trailing edge of each mail piece passes through the take-away nip, resulting in less vibration of the weighing platform as mail pieces exit the weighing platform. The reduction in vibration results quicker settling of the weighing platform during weighing of subsequent mail piece, allowing for faster weighing of the mail pieces, which increases the throughput of the mailing machine.

10 Claims, 7 Drawing Sheets

MAILING MACHINE TRANSPORT SYSTEM WITH INTEGRAL SCALE FOR WEIGHING MAIL PIECES WHERE THE CONTACT FORCE ON THE TAKE AWAY ROLLERS IS REDUCED TO ELIMINATE OSCILLATIONS OF THE WEIGHING PLATFORM

FIELD OF THE INVENTION

The invention disclosed herein relates generally to mail processing systems, and more particularly to a mail processing system having a transport system with an integral scale that reduces the time required for weighing mail pieces.

BACKGROUND OF THE INVENTION

Mail processing systems for preparing mail pieces, e.g., stuffing envelopes, and/or printing postage indicia on envelopes and other forms of mail pieces have long been well known and have enjoyed considerable commercial success. There are many different types of mail processing systems, ranging from relatively small units that handle only one mail piece at a time, to large, multi-functional units that can process thousands of mail pieces per hour in a continuous stream operation. The larger mailing machines often include different modules that automate the processes of producing mail pieces, each of which performs a different task on the mail piece. Such modules could include, for example, a singulating module, i.e., separating a stack of mail pieces such that the mail pieces are conveyed one at a time along the transport path, a moistening/sealing module, i.e., wetting and closing the glued flap of an envelope, a weighing module, and a metering module, i.e., applying evidence of postage to the mail piece. The exact configuration of the mailing machine is, of course, particular to the needs of the user.

Typically, a control device, such as, for example, a microprocessor, performs user interface and controller functions for the mail processing system. Specifically, the control device provides all user interfaces, executes control of the mail processing system and print operations, calculates postage for debit based upon rate tables, provides the conduit for the Postal Security Device (PSD) to transfer postage indicia to the printer, operates with peripherals for accounting, printing and weighing, and conducts communications with a data center for postage funds refill, software download, rates download, and market-oriented data capture. The control device, in conjunction with an embedded PSD, constitutes the system meter that satisfies U.S. information-based indicia postage meter requirements and other international postal regulations regarding closed system meters.

In order for these automated mailing machines to be effective, they must process and handle "mixed mail." The term "mixed mail" is used herein to mean sets of intermixed mail pieces of varying size (for example, from postcards to 9"×12" flats), thickness (for example, from 0.007 inches thick up to 0.75 inches thick), and weight (for example, from less than one ounce up to several pounds). In addition, the term "mixed mail" also includes stepped mail (i.e., an envelope containing an insert which is smaller than the envelope to create a step in the envelope), tabbed and untabbed mail products, and mail pieces made from different substrates. Thus, the range of types and sizes of mail pieces which must be processed is extremely broad. In known mixed mail handling machines which separate and transport individual pieces of mail away from a stack of mixed mail, the stack of mixed mail is first loaded onto some type of transport system for subsequent sorting into individual pieces of mail. The mail piece is conveyed downstream utilizing the transport system, such as rollers or a belt, to each of the different modules (as described above) for processing.

One such module can be a weighing module to calculate the weight of a particular mail piece as it is being processed. The calculated weight is provided to the control device for calculation of the postage amount required for the mail piece based on the actual weight. In some weighing modules, the mail piece is temporarily stopped on the scale of the weighing module while the weight is measured, while in others the mail piece is not completely stopped and a weight measurement is made while the mail piece is in motion. In either case, it is necessary to ensure that an accurate weight has been determined, since the postage amount is determined based on the weight. If the weighing module does not accurately weigh a mail piece, the amount of postage applied to the mail piece will either be too little, resulting in possible non-delivery of the mail piece, or too much, resulting in a loss of funds. The need for determining an accurate weight provides constraints on the time required to determine an accurate weight. In automated mailing machines, there is a constant need to increase the rate at which the scale can determine the weight of a mail piece such that the overall throughput of the machine can be increased. A basic cause of the delay in determining weight for a mail piece is the tendency of the scale to oscillate when a mail piece is being transported (or stopped) on the scale. These oscillations are damped as the scale settles, but only slowly will the scale arrive at a stable output value representative of the weight of the mail piece. To weigh a mail piece as quickly and accurately as possible, it is desirable to minimize the oscillation of the scale, thereby reducing the damping time which results in a faster stable output value representative of the weight of the mail piece.

SUMMARY OF THE INVENTION

The present invention alleviates the problems associated with the prior art and provides a mail processing system having a transport system that reduces the amount of oscillation of the scale to allow for faster weighing of mail pieces.

In accordance with embodiments of the present invention, a mailing machine includes a plurality of different modules through which mail pieces are fed by a transport system. The transport system for a weighing module includes belt and a plurality of pivot arms sequentially mounted along the transport path of the weighing module. Each pivot arm has a respective roller mounted on a free end of the pivot arm. A respective biasing mechanism is associated with each pivot arm to bias the pivot arm toward the belt such that the mail pieces maintain contact with the belt to feed the mail pieces in a downstream direction toward a subsequent module. Each of the respective biasing mechanisms has a first force. A take-away nip, located near the downstream end of the transport path of the weighing module, is formed by a pivot arm having a respective roller mounted on a free end of the pivot arm and a drive roller mounted in the weighing platform of the weighing module. The take-away nip feeds mail pieces from the weighing platform to the subsequent module of the mailing machine. The pivot arm of the take-away nip has a biasing mechanism having a second force, that is less than the first force, that biases the pivot arm in the direction of the drive roller. As mail pieces move through the take-away nip, the reduced force of the biasing mechanism results in less impact force between the pivot arm roller and drive roller when the trailing edge of each mail piece passes through the take-away nip. The reduced impact force results in less vibration of the weighing platform as mail pieces exit the weighing platform.

The reduction in vibration results in less oscillation of the weighing platform, which allows the weighing platform to settle more quickly during the weighing of the next mail piece that is transported onto the weighing platform while the previous mail piece is exiting the weighing platform. The reduction in settling time allows for faster weighing of the mail pieces, which increases the throughput of the mailing machine.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate a presently preferred embodiment of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
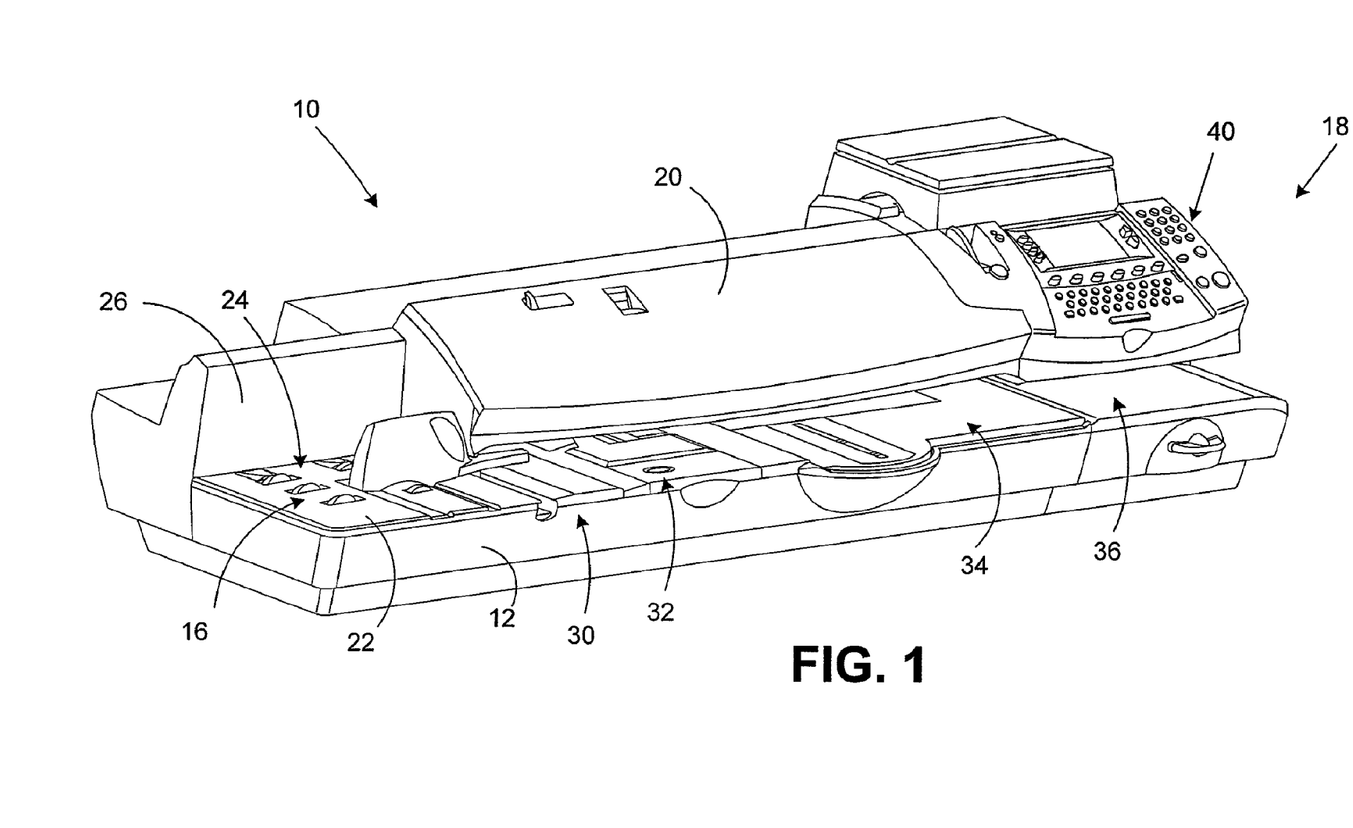
FIG. 1 illustrates an example of a mail processing system according to an embodiment of the present invention.

In describing the present invention, reference is made to the drawings, wherein there is seen in FIG. 1 an illustrative mail processing system in the form of a mailing machine 10 according to an embodiment of the present invention. Mailing machine 10 comprises a base unit, designated generally by the reference numeral 12, the base unit 12 having a mail piece input end, designated generally by the reference numeral 16, and a mail piece output end, designated generally by the reference numeral 18. One or more cover members 20 are pivotally mounted on the base 12 so as to move from the closed position shown in FIG. 1 to an open position (not shown) to expose various operating components and parts for service and/or repair as needed.

The base unit 12 further includes a horizontal feed deck 22 which extends substantially from the input end 16 to the output end 18. A plurality of nudger rollers 24 are suitably mounted under the feed deck 22 and project upwardly through openings in the feed deck so that the periphery of the rollers 24 is slightly above the upper surface of the feed deck 22 and can exert a forward feeding force on a succession of mail pieces placed in the input end 16. A registration wall 26 defines a mail piece registration surface substantially perpendicular to the feed deck 22 that extends substantially from the input end 16 to the output end 18. Mail pieces placed in the input end 16 are fed by the nudger rollers 24 along the feed deck 22, with the top edge of the mail piece being registered against the wall 26. The mail pieces may be passed through one or more modules, such as, for example, a singulator module 30, a moistening/sealing module 32, a weighing module 34, and a printing module 36. An optional stacking bin (not shown) may be provided at the output end 18 of the mailing machine 10.

Mailing machine 10 includes a control unit 40 that preferably includes one or more processing units, such as, for example, a microprocessor, general or special purpose processor or the like, to control operation of the mailing machine 10. Specifically, the control unit 40, in conjunction with one or more other processors or controllers (not shown), provides all user interfaces, executes control of the mailing machine 10, calculates postage for debit based upon rate tables, provides the conduit for an associated Postal Security Device (PSD) to transfer postage indicia for printing, operates with peripherals for accounting, printing and weighing, and conducts communications with a data center for postage funds refill, software download, rates download, and market-oriented data capture. The PSD, which is preferably embedded in the control unit 40, contains one or more registers that store the accounting information concerning usage, such as, for example, an ascending register, descending register, piece count register, and the like. The control unit 40, in conjunction with the embedded PSD, provides the system meter that satisfies U.S. and international postal regulations regarding closed system information-based indicia postage (IBIP) meters.

Figure 2:
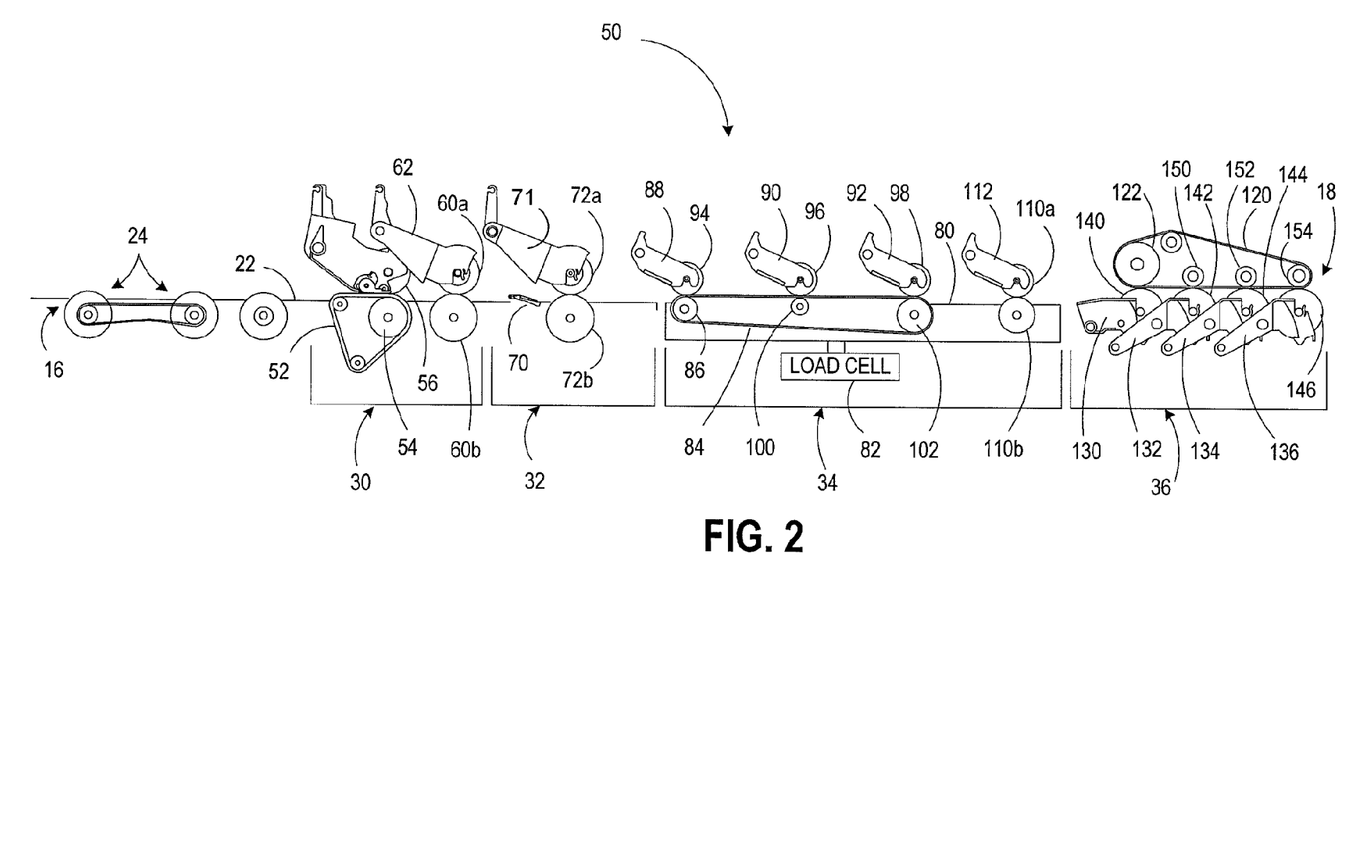
FIG. 2 illustrates in partial schematic diagram form an example of a transport system used by the mail processing system of FIG. 1 according to an embodiment of the present invention.

Mailing machine 10 further includes a transport system described in more detail in FIG. 2. In general, the transport system includes the nudger rollers 24 and other rollers and/or belts (not visible in FIG. 1) that are located under the cover member 20, and is utilized to transport mail pieces along a transport path through the mail processing system 10 in the direction from the input end 16 to the output end 18. The transport system will transport the mail pieces through the singulator module 30 to separate a stack of mail pieces placed on the nudger rollers 24 and feed them in seriatim fashion to the moistening/sealing module 32. The transport will then carry the mail pieces through the weighing module 34 for weighing, and through the printing module 36 where an indicium, generated by the control unit 40, is printed on each mail piece, or alternatively, on a tape to be placed onto a mail piece. Sensors (not shown) located along the feed deck 22 and within the transport system provide signals to the control unit 40 to indicate the position of a mail piece in the mailing machine 10.

FIG. 2 illustrates in partial schematic diagram form an example of a transport system 50 that can be used in the mailing machine 10 of FIG. 1. The nudger rollers 24 are located near the input end 16 of the mailing machine 10 and are motorized to urge mail pieces placed thereon in the direction of the singulator module 30. The singulator module 30 includes a belt 52 mounted on a drive roller 54 which is coupled by any suitable drive train (not shown) to a motor (not shown) to rotate the belt 52 in a clockwise direction. The belt 52 is raised above the top of the feed deck 22 such that it will engage the bottom mail piece in a stack of mail pieces (not shown) and pull the stack of mail pieces into engagement with a pivot arm 55 that includes a reverse singulating belt (or roller) 56. The pivot arm 55 is preferably spring loaded such that the belt 56 exerts a downward pressure on the top of the mail pieces in the stack while being driven to rotate in a clockwise direction to push the mail pieces on top of the stack in the reverse direction (back towards the input end 16 of the mailing machine 10). In this manner, only the bottom most mail piece of the stack advances to a take-away nip formed by rollers 60*a*, 60*b*. A more detailed description of an exemplary singulator module can be found in U.S. Pat. No. 4,978,114, the disclosure of which is specifically incorporated herein by reference. A drive roller 60*b* extends above the top of the feed deck 22 and is suitably coupled to a motor (not shown) such that it will rotate to move the mail piece along the feed deck 22. Roller 60*a* is mounted to a pivot arm 62, which is preferably spring loaded to apply a downward force to the mail piece so that the mail piece is maintained in frictional contact with the drive roller 60*b*. The take-away nip formed by rollers 60*a*, 60*b* serves to transport the mail piece removed from the stack of mail pieces into the moistening/sealing module 32. Preferably, the roller 60*b* operates at a slightly faster speed than the belt 54, thereby maintaining the mail piece under tension and preventing buckling of the mail piece.

The moistening/sealing module 32 can include a conventional stripper blade/moistening apparatus 70 that, when activated, operates to open and moisten the flap of the mail piece. A take-away nip formed by a pivot arm 71, which is preferably spring loaded, having a roller 72*a* and a drive roller 72*b*, which are similar to the rollers 60*a*, 60*b*, respectively, serves to transport the mail piece into the weighing module 34 and also to provide pressure to seal the moistened flap of the mail piece to the body of the envelope. Preferably, the drive roller 72*b* operates at a slightly faster speed than the drive roller 60*b*, thereby maintaining the mail piece under tension and preventing buckling of the mail piece.

The weighing module includes a weighing platform 80 that is separate from the feed deck 22. The weighing platform 80 is coupled to a load cell 82 which determines the weight of a mail piece on the weighing platform 80. The weighing module 34 can utilize a drive belt 84 mounted on a drive roller 102. The top of the drive belt 84 is raised above the weighing platform 80 to contact a mail piece on the weighing platform 80. Drive roller 102 is coupled by any suitable drive train to a motor (not shown) that causes the belt 84 to rotate in a clockwise direction to move a mail piece through a transport path of the weighing module 34. Preferably, the belt 84 operates at a slightly faster speed than the drive roller 72*b*, thereby maintaining the mail piece under tension as it enters the weighing module 34 and preventing buckling of the mail piece. Alternatively, belt 84 could be replaced by drive rollers mounted in the weighing platform such that a portion of each of the drive rollers extends above the surface of the weighing platform 80 to contact mail pieces thereon. To keep the mail piece in contact with the drive belt 84 (or drive rollers if provided), pivot arms 88, 90, and 92 are provided above the drive belt 84. At the free end of each pivot arm 88, 90, 92, a roller 94, 96, 98 is mounted to contact the mail piece. Each of the pivot arms 88, 90, 92 is preferably provided with a biasing mechanism, such as, for example, a torsion spring having a specified force, such that it will exert a downward force (toward the belt 84) on its respective roller 94, 96, 98. As the mail piece is driven by the drive belt 84, the force from the pivot arms 88, 90, 92 is applied to the mail piece by the rollers 94, 96, 98 so that the bottom of the mail piece is maintained in frictional contact with the drive belt 84 (or drive rollers). To prevent the drive belt 84 from deflecting due to the force imparted by the pivot arms 88, 90, 92, a respective backup roller (including rollers 86, 100 and drive roller 102) is provided behind the drive belt 84 at each point where the belt 84 is in contact with a roller 94, 96, 98. Each pair of rollers formed of a pivot arm roller 94, 96, 98 and the corresponding backup roller 86, 100, 102 constitutes a nip through which the mail piece is fed by the drive belt 84. A take-away nip is formed at the downstream end of the transport path of the weighing module 34 by take-away rollers 110*a*, 110*b*. Roller 110*b* is mounted in the weighing platform 80 such that a portion thereof is raised slightly above the surface of the weighing platform 80. Roller 110*a* is mounted on a pivot arm 112. Pivot arm 112 is also preferably provided with a biasing mechanism, such as, for example, a torsion spring having a specified force, such that it will exert a downward force on its roller 110*a* to apply a force to the mail piece to keep it in frictional contact with the drive roller 110*b*. The drive roller 110*b* is coupled to a motor (not shown) to rotate in a clockwise direction to move a mail piece off of the weighing platform 80 and into the printing module 36. Preferably, the drive roller 110*b* operates at a slightly faster speed than the belt 84, thereby maintaining the mail piece under tension and preventing buckling of the mail piece as it enters the printing module 36. The entire transport assembly, including the pivot arms 88, 90, 92 and 112 and the rollers 94, 96, 98, 110*a* on the end of each, is mounted to or mechanically coupled to the weighing platform 80 and thus forms part of the tare weight for the load cell 82.

Figure 3:
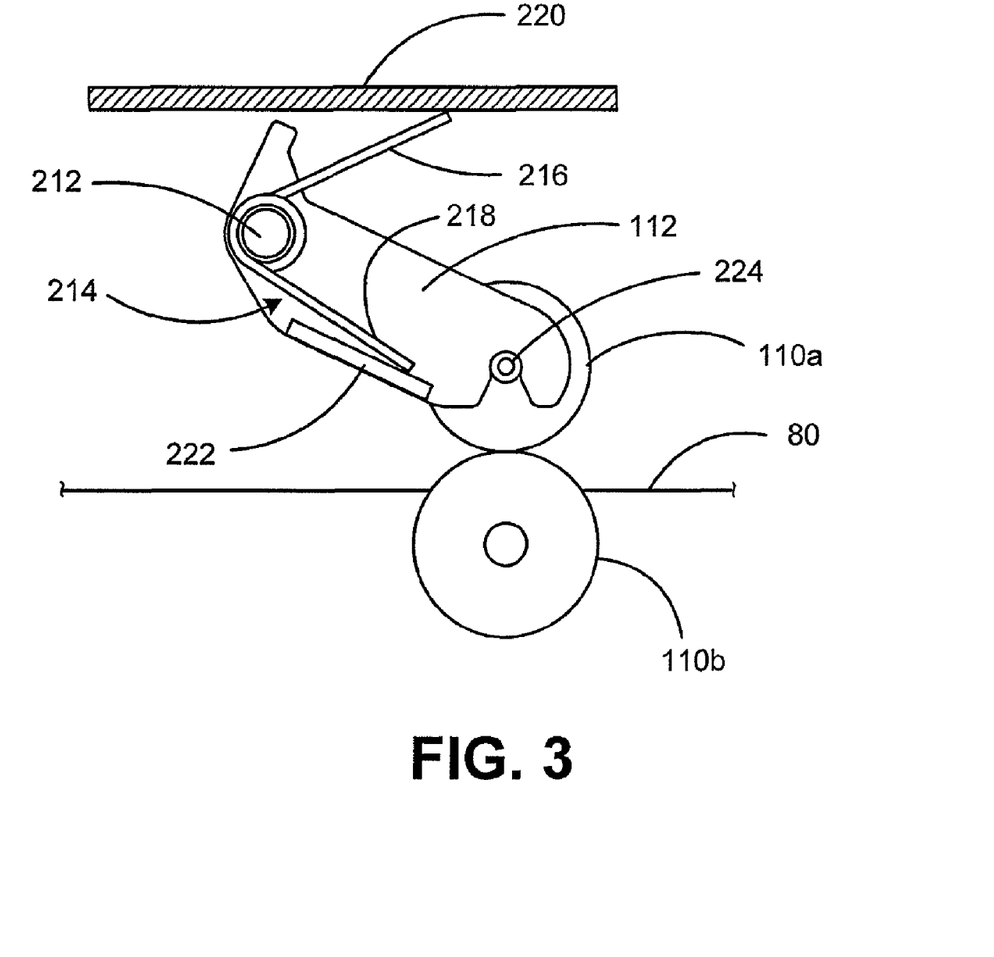
FIG. 3 illustrates an example of a biasing mechanism for a pivot arm that can be used in the transport system according to an embodiment.

FIG. 3 illustrates an example of a biasing mechanism that can be use on the pivot arms 88, 90, 92 and 112. While FIG. 3 illustrates the pivot arm 112, it should be understood that the description can also apply to the pivot arms 88, 90, 92. Referring to FIG. 3, pivot arm 112 is mounted on a pivot point 212. A torsion spring 214 is mounted on the pivot point 212. A first end 216 of the torsion spring 214 abuts a fixed surface 220, such as, for example, a frame, mounting bracket, support piece, or the like. The second end 218 of the torsion spring abuts a projection 222 on the pivot arm 112. Roller 110*a* freely rotates about an axis 224. The force of the torsion spring 214 to unwind causes a downward force on the projection 222, resulting in the roller 110*a* being pushed downward into contact with the drive roller 110*b*. As a mail piece moves through the nip formed by the rollers 110*a*, 110*b*, the pivot arm 112 will be pushed upward by the force of the mail piece to allow the mail piece to pass through but still maintain pressure on the mail piece to keep it in contact with the drive roller 110*b*.

The printing module 36 includes a drive belt 120 that is mounted on a drive roller 122. In contrast with the transport components of the other modules of mailing machine 10, the main drive mechanism for the printing module 36 (belt 120) is located such that it contacts the top surface of the mail piece as compared to drive mechanisms (belt 54, drive roller 60*b*, drive roller 72*b*, belt 84, and drive roller 110*b*) of the other modules contacting the bottom surface of the mail piece. As such, the mail piece must transition from being bottom registered, i.e., contacting the drive mechanism (belt 54, drive roller 60*b*, drive roller 72*b*, belt 84, and drive roller 110*b*) on the bottom of the mail piece, to being top registered, i.e., contacting the drive mechanism (belt 120) on the top of the mail piece. To keep the mail piece in contact with the drive belt 120, pivot arms 130, 132, 134, 136, which are preferably spring-loaded, are provided below the drive belt 120. At the free end of each pivot arm 130, 132, 134, 136 a roller 140, 142, 144, 146 is mounted to contact the mail piece as the mail piece is driven by the drive belt 120 and to apply an upward force to the mail piece so that the mail piece is maintained in frictional contact with the drive belt 120. To prevent the drive belt 120 from deflecting due to the force imparted by the pivot arms 130, 132, 134, 136, a respective backup roller (including drive roller 122 and rollers 150, 152 and 154) is provided behind the drive belt 120 at each point where the belt 120 is in contact with a roller 140, 142, 144, 146. Each pair of rollers formed of a pivot arm roller 140, 142, 144, 146 and the corresponding backup roller 122, 150, 152, 154 constitutes a nip through which the mail piece is fed by the drive belt 120.

The number of mail pieces that can be processed by the mailing machine 10, referred to as throughput and usually expressed in letters per minute, is based on several factors. When operating in a weighing mode, in which each mail piece will be weighed by the weighing module 34, one factor that reduces the throughput is the amount of time required for each mail piece to be accurately weighed. To increase the throughput, it is desirous to reduce the amount of time necessary to weigh a mail piece. However, it is also necessary to ensure that an accurate weight has been determined, since the postage amount is determined based on the weight. If the weighing module 34 does not accurately weigh a mail piece, the amount of postage applied to the mail piece will either be too little, resulting in possible non-delivery of the mail piece, or too much, resulting in a loss of funds. One way to increase throughput is to operate the transport system 50 as quickly as possible. Although only a single mail piece can be on the weighing platform 80 for weighing of the mail piece, the transport system 50 can be operated such that after a mail piece has been weighed and is being removed from the weighing platform 80, the next mail piece is being transported onto the weighing platform 80 to be weighed. However, the weight of the next mail piece cannot be accurately determined until the trail edge of the previous mail piece has left the weighing platform 80 and the weighing platform has sufficiently stabilized.

When a mail piece enters onto the weighing platform 80 a signal is produced by the load cell 82. This signal is processed through electronics and software where it is amplified, concerted form analog to digital, the then filtered. The signal has the general shape of a damped sinusoid, caused by the tendency of the weighing platform 80 to oscillate on the load cell 82 as a mail piece enters the weighing platform 80 for weighing. These oscillations are damped as the weighing platform 80 settles, but only slowly will the load cell 82 arrive at a stable output value representative of the weight of the mail piece. The signal from the load cell 82 is processed using a weighing algorithm to determine the weight. Numerous weighing algorithms have been developed that attempt to reduce the waiting time by, for example, calling a weight based on the first peak of the sinusoidal waveform, or some function of the first peak and first valley of the sinusoidal waveform. While many of these algorithms have successfully reduced the amount of time required for determining the weight, the time required is still a function of the oscillation of the weighing platform 80. Reducing the oscillation of the weighing platform 80 will allow the weighing algorithms to operate more efficiently and call an accurate weight in less time.

There are several known factors that can contribute to the amount of oscillation of the weighing platform 80, mostly associated with the construction of the weighing module 34, the speed of operation of the transport system 50, the operation of the other components of the mailing machine 10 (e.g., printing module 36) during weighing, and the forces associated with the introduction and stopping (if performed) of each new mail piece onto the weighing platform 80. Conventional solutions associated with reducing the oscillation of the weighing platform 80 have been focused on these areas. The present inventor has discovered that mail pieces exiting the weighing platform 80 can also have an effect on the oscillation of the weighing platform 80, an effect that was neither known nor considered in conventional mailing machines. Specifically, as each mail piece leaves the weighing platform 80, the trailing edge of the mail piece, due to the forces imparted on the mail piece as it enters into the printing module 36, will cause the roller 110a on spring-loaded pivot arm 112 to flip upward as the mail piece is transported. When the trailing edge has cleared the roller 110a, the roller 110a will be forced back toward the weighing platform 80 due to the spring-loaded force of the pivot arm 112. The roller 110a will impact the drive roller 110b, which causes the weighing platform 80 to oscillate. The greater the spring loaded force of the pivot arm 112, the greater the force of the impact with which the roller 110a will hit the drive roller 110b when it springs back down toward the weighing platform 80. This effect may be further exacerbated by transport systems that have to transition the mail pieces from bottom registration transport components to top registration transport components, as the forces imparted on the mail piece can cause the trail edge of the mail piece to rotate upward which will increase the amount of upward force the trail edge of the mail piece applies to the roller 110a of the last nip of the weighing platform 80. The greater the force with which the roller 110a is pushed upward, the higher it will go, resulting in a greater impact force on the drive roller 110b when it returns to its home position by the spring action of the pivot arm 112.

Figure 4:
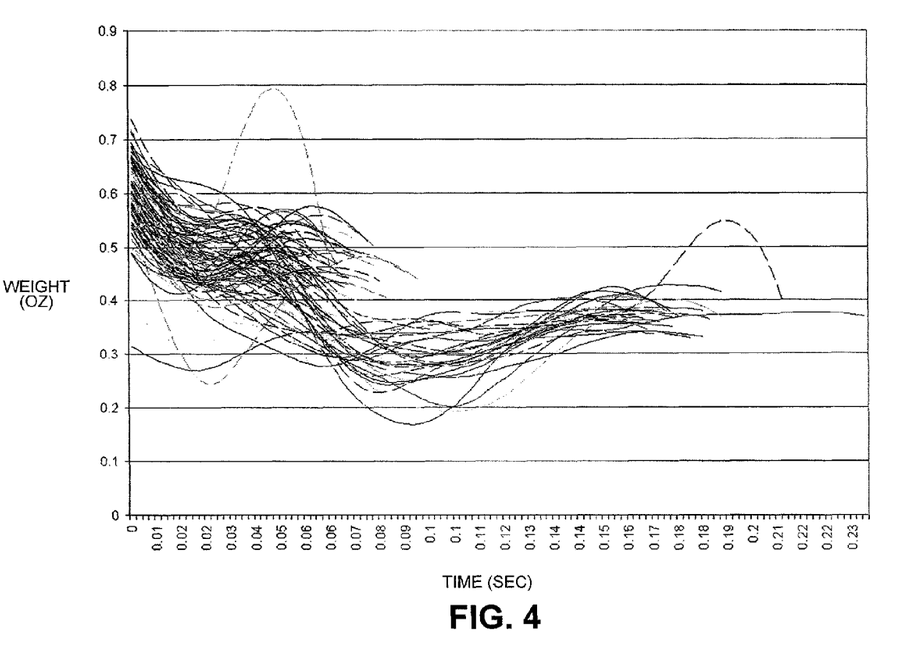
FIG. 4 illustrates in graph form a first set of results for the time required to determine the weight of mail pieces.

Conventional transport systems have utilized spring-loaded pivot arms with identical force on each nip formed in the transport path of a mail piece. This force has to be large enough to maintain contact with thin sheet material, e.g., postcards and the like, while not being too large to prevent thicker mail pieces from deflecting the pivot arm to be able to move through the nip. FIG. 4 illustrates the wave form signals for ninety standard #10 envelopes having a single page insert that were weighed using a transport system 50 as illustrated in FIG. 2 with each of the four pivot arms 88, 90, 92, 112 spring-loaded with a respective spring having a force of 0.75 pounds. The end of each of the lines on the graph represents the time required for the load cell 82 to determine an accurate weight. As can be seen from FIG. 4, the time required for approximately one-third of the test envelopes to be accurately weighed is greater than approximately 0.17 seconds.

Figure 5:
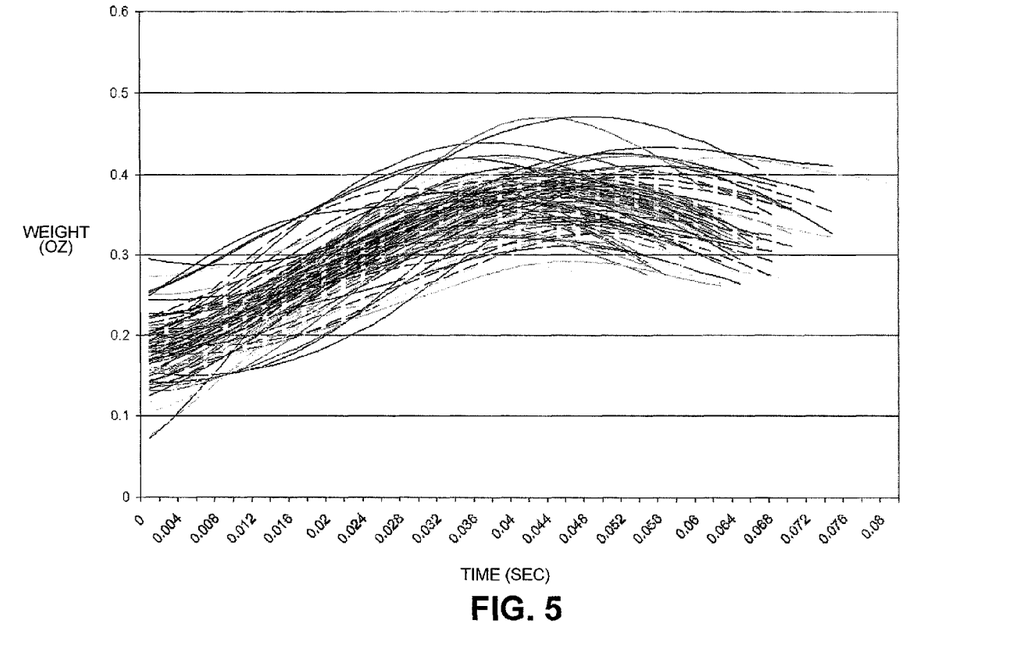
FIG. 5 illustrates in graph form a second set of results for the time required to determine the weight of mail pieces.
Figure 6:
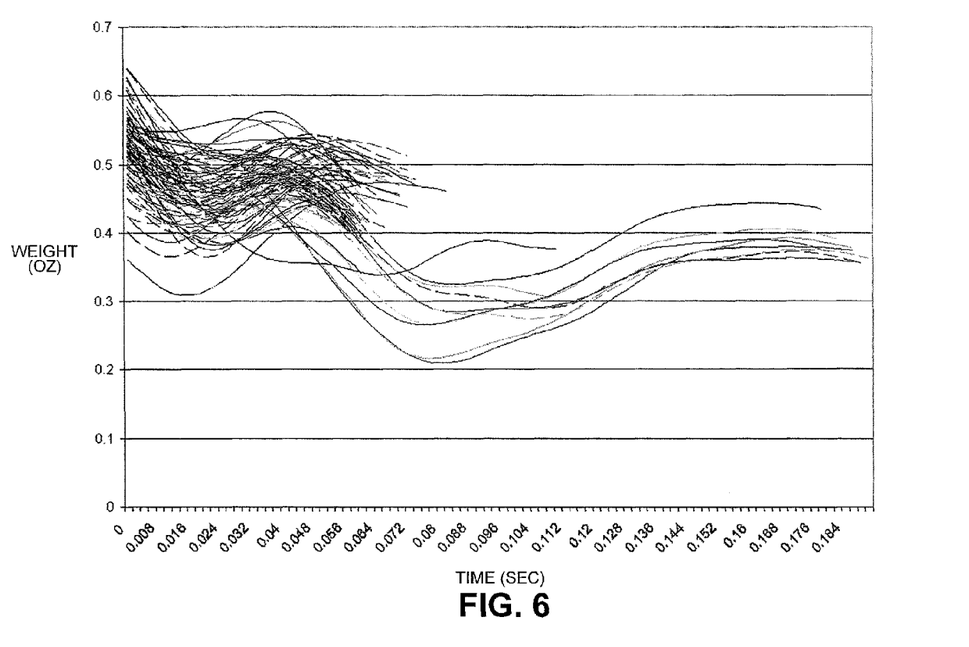
FIG. 6 illustrates in graph form a third set of results for the time required to determine the weight of mail pieces.
Figure 7:
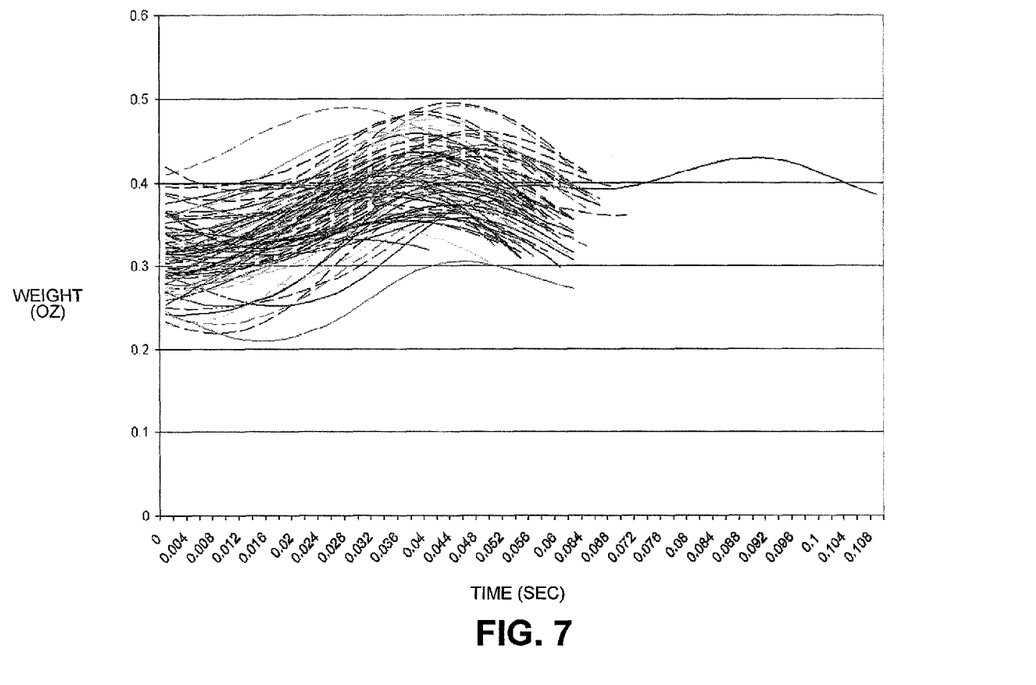
FIG. 7 illustrates in graph form a fourth set of results for the time required to determine the weight of mail pieces.

FIG. 5 illustrates the wave form signals for the same test envelopes (#10 envelopes with a single page insert) that were weighed using a transport system 50 as illustrated in FIG. 2 with each of the first three pivot arms 88, 90, 92 spring-loaded with a spring having a force of 0.75 pounds and the fourth pivot arm 112 not having any spring force (thereby relying on gravity to maintain contact between the rollers 110a and 100b). As can be seen from FIG. 5, the weight for all of the envelopes has been accurately determined in approximately 0.075 seconds or less, a significant time reduction of approximately 56% as compared to FIG. 4 when the fourth pivot arm 112 is set with a spring force of 0.75 pounds. FIG. 6 illustrates the wave form signals for the same test envelopes (#10 envelopes with a single page insert) that were weighed using a transport system 50 as illustrated in FIG. 2 with each of the first three pivot arms 88, 90, 92 spring-loaded with a spring having a force of 0.75 pounds and the fourth pivot arm 112 spring-loaded with a spring having a force of 0.5 pounds. As can be seen from FIG. 6, the weight for a large majority of the envelopes has also been accurately determined in approximately 0.075 seconds or less, a significant time reduction of approximately 56% as compared to FIG. 4. However, approximately 10% of the test sample still required a time of greater than 0.1 seconds to be accurately weighed. FIG. 7 illustrates the wave form signals for the same test envelopes (#10 envelopes with a single page insert) that were weighed using a transport system 50 as illustrated in FIG. 2 with each of the first three pivot arms 88, 90, 92 spring-loaded with a spring having a force of 0.75 pounds and the fourth pivot arm 112 spring-loaded with a spring force of 0.25 pounds. As can be seen from FIG. 7, the weight for every envelope, with the sole exception of a single envelope, has been accurately determined in approximately 0.068 seconds or less time, a significant time reduction of approximately 60% as compared to FIG. 4 when the fourth pivot arm is set with a spring force of 0.75 pounds. Thus, by reducing the spring force on the spring loaded arm 112 from 0.75 pounds to 0.25 pounds, there is a significant and unexpected decrease in the time required to determine the weight of envelopes of approximately 60%.

Referring again to FIG. 2, each of the pivot arms 88, 90, and 92 is spring-loaded with a spring having a force of 0.75 pounds, while the pivot arm 112 is preferably spring-loaded with a force less than 0.75 pounds, and preferably a force of 0.25 pounds. In this manner, the force of the spring-loaded pivot arm 112 causing the roller 110a to impact the roller 110b when returning to its home position is reduced, which results in less vibration imparted on the weighing platform 80 and thus less oscillation of the weighing platform 80. This results in a significant and unexpected decrease in the time required for the load cell 82 of weighing module 34 to weigh mail pieces by approximately 60%. This decrease in the time required for weighing can result in an increase in the throughput of the mailing machine 10.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

What is claimed is:

1. A mail processing system comprising:
   a transport path for transporting a mail piece through the mail processing system;
   a weighing module for weighing the mail piece being transported along the transport path, the weighing module including a load cell for determining a weight of the mail piece;
   a weighing platform supported by the load cell, the weighing platform for supporting the mail piece being weighed by the load cell;
   at least one first nip located along the weighing platform, each of the at least one first nip formed by a first roller mounted on a respective pivot arm having a first biasing mechanism to bias the pivot arm toward the weighing platform such that the first rollers apply force to the mail piece on the weighing platform to maintain the mail piece in contact with a driving device that moves the mail piece along the transport path through the weighing module, the first biasing mechanism having a first force;
   a take-away nip located in a downstream direction from the at least one first nip along the weighing platform to feed the mail piece from the weighing module to a subsequent module along the transport path of the mail processing system, the take-away nip being formed by a take-away roller and a drive roller mounted in the weighing platform, the take-away roller being mounted on a take-away pivot arm having a second biasing mechanism to bias the pivot arm toward the weighing platform such the take-away roller applies force to the mail piece to maintain the mail piece in contact with the drive roller, the second biasing mechanism having a second force that is less than the first force.

2. The mail processing system of claim 1, wherein the driving device further comprises:
   a belt positioned to contact a mail piece on a weighing platform of the weighing module to move the mail piece along the weighing platform.

3. The mail processing system of claim 1, wherein the driving device further comprises:
   at least one second roller positioned to contact a mail piece on a weighing platform of the weighing module to move the mail piece along the weighing platform.

4. The mail processing system of claim 1, wherein the first and second biasing mechanisms are torsion springs.

5. The mail processing system of claim 4, wherein the second force is approximately 0.25 pounds.

6. The mail processing system of claim 5, wherein the first force is approximately 0.75 pounds.

7. A weighing module for weighing mail pieces being processed by a mail processing system, the weighing module comprising:
   a load cell;
   a weighing platform supported by the load cell;
   a belt positioned to contact a mail piece on a weighing platform of the weighing module to move the mail piece along the weighing platform;
   at least one of pivot arm having a respective roller mounted thereon, each of the at least one pivot arms having a respective first biasing mechanism to bias the pivot arm toward the weighing platform such that the roller contacts the belt, the first biasing mechanism having a first force; and
   a take-away nip located in a downstream direction from the belt, the take-away nip being formed by a take-away roller and a drive roller mounted in the weighing platform, the drive roller having a portion that extends above the weighing platform, the take-away roller being mounted on a take-away pivot arm having a second biasing mechanism to bias the pivot arm toward the weighing platform such the take-away roller contacts the drive roller, the second biasing mechanism having a second force that is less than the first force.

8. The weighing module of claim 7, wherein the first and second biasing mechanisms are torsion springs.

9. The weighing module of claim 8, wherein the second force is approximately 0.25 pounds.

10. The weighing module of claim 9, wherein the first force is approximately 0.75 pounds.

* * * * *